(12) United States Patent
Pan (10) Patent No.: US 8,345,352 B2
(45) Date of Patent: Jan. 1, 2013

(54) POLARIZATION-MAINTAINING REFLECTOR ARRANGEMENT

(75) Inventor: Jiangen Pan, Hangzhou (CN)

(73) Assignee: Everfine Photo-E-Info Co., Ltd., Zhejiang (CN)

( * ) Notice: Subject to any disclaimer, the term of this patent is extended or adjusted under 35 U.S.C. 154(b) by 644 days.

(21) Appl. No.: 12/496,439

(22) Filed: Jul. 1, 2009

(65) Prior Publication Data

US 2010/0007953 A1 Jan. 14, 2010

(30) Foreign Application Priority Data

Jul. 8, 2008 (CN) .......................... 2008 1 0063060

(51) Int. Cl.
*G02B 5/30* (2006.01)
(52) U.S. Cl. ......... 359/485.07; 359/489.15; 359/490.01; 359/857; 359/861
(58) Field of Classification Search ............. 359/485.07, 359/490.01, 490.03, 857, 861, 862, 490.02
See application file for complete search history.

(56) References Cited

U.S. PATENT DOCUMENTS

| 5,946,054 A | * | 8/1999 | Sannohe et al. | ............... 348/745 |
| 6,717,729 B2 | * | 4/2004 | Goto et al. | ............... 359/485.02 |

FOREIGN PATENT DOCUMENTS

CN 201233470 5/2009

* cited by examiner

*Primary Examiner* — Frank Font
(74) *Attorney, Agent, or Firm* — Hamre, Schumann, Mueller & Larson, P.C.

(57) ABSTRACT

The present invention discloses a polarization-maintaining reflector arrangement comprising a reflector group including at least one polarizing reflector and at least one compensating reflector, wherein the incident plane for the polarizing reflectors is perpendicular to the incident plane for the compensating reflectors, and the product of s-wave reflectance of all the polarizing reflectors and p-wave reflectance of all the compensating reflectors is equal to the product of s-wave reflectance of all the compensating reflectors and p-wave reflectance of all the polarizing reflectors. One or more reflector groups can be used in the light path. The invention can conveniently and effectively eliminate the polarization caused by reflection.

12 Claims, 6 Drawing Sheets

POLARIZATION-MAINTAINING REFLECTOR ARRANGEMENT

FIELD

This disclosure relates to an optical measurement or instrument, and more particularly relates to a reflector arrangement which can effectively eliminate unwanted polarization in reflection

BACKGROUND

Figure 1:
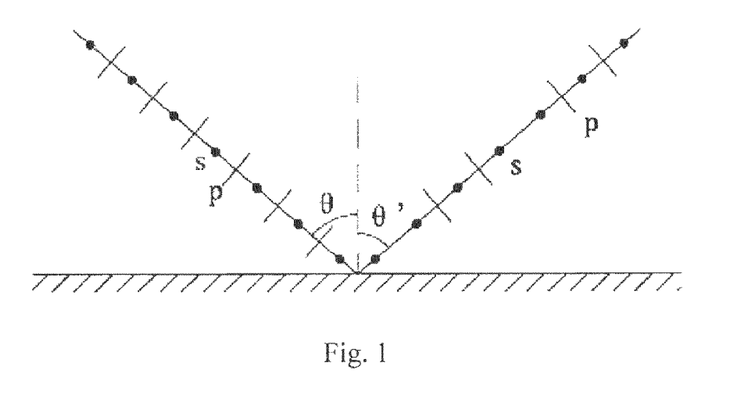
FIG. 1 is a schematic illustration of the principle of the natural light being polarized by mirror reflection.

Reflecting light with a certain angle of incidence can change the polarization state of the reflected light relative to the incident light, and the total reflectance is dependent on the polarization state. As shown in FIG. 1, a beam of natural light is polarized after being reflected.

The plane of incidence is determined by the incident light and the normal to the reflecting surface. A beam of incident light can be divided into two perpendicular-polarized waves, i.e. s- and p-wave, wherein the oscillation direction of s-wave is perpendicular to the incident plane and the oscillation direction of p-wave is parallel to the incident plane. After reflection, the light intensity is $$I_m = I_p \cdot \rho_p(\theta) + I_s \cdot \rho_s(\theta)$$

Figure 2A:
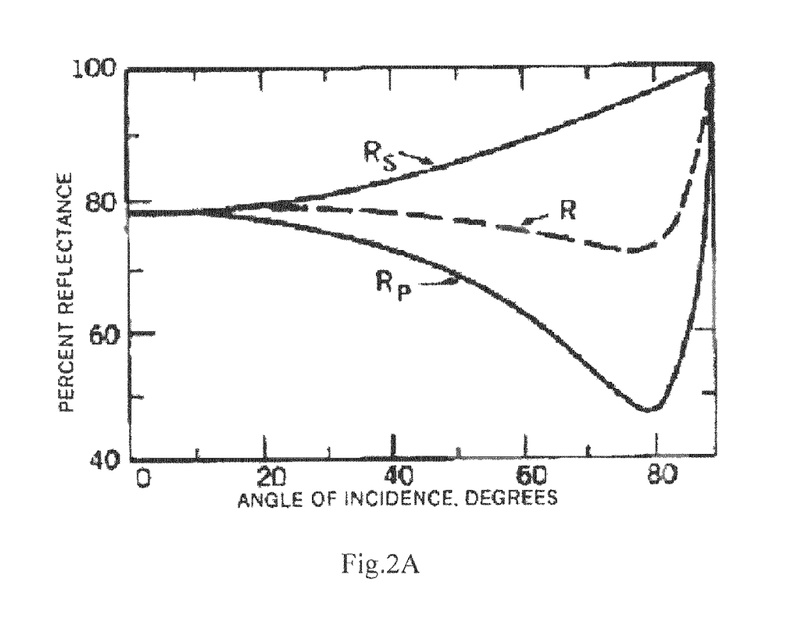
FIG. 2A is a schematic illustration of the reflectance curve of p-wave and s-wave for typical metal material.
Figure 2B:
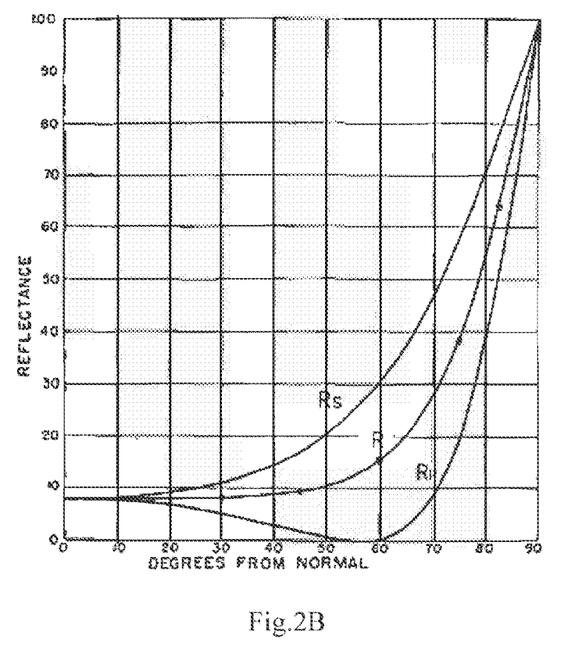
FIG. 2B is a schematic illustration of the reflectance curve of p-wave and s-wave for typical medium material.

As shown in FIG. 2, the difference between the reflectance of s-wave ($R_S$) and p-wave ($R_p$) causes the reflected light to have unwanted polarization. For example, if the incident light is natural light, the reflected light will be partially polarized light, and if the incident light is polarized light, the polarization state of reflected light will be changed. In addition, the difference between s-wave reflectance and p-wave reflectance is dependent on the angle of incidence. Therefore, the unwanted polarization is dependent on the angle of incidence.

The total reflectance is the ratio of the reflected light intensity to the incident light intensity. Because the natural light intensity of s-wave or p-wave is half of the total light intensity, the total reflectance of the natural light is the arithmetic mean value of the s-wave reflectance and p-wave reflectance. For polarized incident light, the total reflectance is more complicated to determine due to the polarization dependence. Under a certain angle of incidence, the total reflectance is dependent on the polarization state of the incident light. When the angle of incidence is relatively big, this dependence can result in an inevitable principal error in accurate optical measurement.

In addition, according to FIG. 2, the polarization caused by reflection on the medium surface is different from the polarization caused by reflection on the metal surface. The average reflectance on metal surface is ordinarily higher than that on the medium surface. Furthermore, the average reflectance and the difference between s-wave reflectance and p-wave reflectance are changed according to the different metal material.

Reflector is a very important optical element, and it is widely used in varieties of fields of optics. Although polarization is an unnegligible problem in many fields, there is no convenience, economical, and effective way to eliminate unwanted polarization in reflection.

At present, the ordinary method to solve this problem is to coat on reflector surface, but this method is expensive and the effect is limited. This method can reduce the unwanted polarization at some degree. However, the difference between p-wave reflectance and s-wave reflectance still exists in the. Furthermore, the coating method can only be applied to the reflection with a narrow wave band and with limited angle of incidence. The angle of incidence can not be freely changed. Otherwise, the effect of reducing polarization will be affected.

This invention can conveniently and effectively eliminate the polarization by reflection, and can be applied in a microscope or a goniophotometer or other optical systems with reflection in the light path.

SUMMARY

A polarization-maintaining reflector arrangement disclosed herein helps conveniently and effectively eliminate the unwanted polarization in reflection. The total reflectance of the polarization-maintaining reflector arrangement is independent of the polarization state of the incident light, and the polarization state of the reflected light remains the same as the polarization state of the incident light.

In one embodiment, a polarization-maintaining reflector arrangement comprises at least one reflector group. The at least one reflector group includes at least one polarizing reflector and at least one compensating reflector. An incident plane of the polarizing reflector is perpendicular to an incident plane of the compensating reflector in the reflector group. A product of s-wave reflectance of the polarizing reflector and p-wave reflectance of the compensating reflector is equal to a product of s-wave reflectance of the compensating reflector and p-wave reflectance of the polarizing reflector in the reflector group.

In another embodiment, a polarization-maintaining reflector arrangement comprises at least one reflector group. The at least one reflector group including m polarizing reflector(s) and n compensating reflector(s). Incident plane(s) of all the polarizing reflector(s) being parallel to each other or in a same plane. Incident plane(s) of all the compensating reflector(s) being parallel to each other or in a same plane. The incident plane(s) of the polarizing reflector(s) being perpendicular to the incident plane(s) of the compensating reflector(s) in the reflector group.

$$\frac{\rho_{q1s}(\theta_{q1})}{\rho_{q1p}(\theta_{q1})} \cdot \ldots \cdot \frac{\rho_{qis}(\theta_{qi})}{\rho_{qip}(\theta_{qi})} \cdot \ldots \cdot \frac{\rho_{qms}(\theta_{qm})}{\rho_{qmp}(\theta_{qm})} = \frac{\rho_{b1s}(\theta_{b1})}{\rho_{b1p}(\theta_{b1})} \cdot \ldots \cdot \frac{\rho_{bjs}(\theta_{bj})}{\rho_{bjp}(\theta_{bj})} \cdot \ldots \cdot \frac{\rho_{bns}(\theta_{bn})}{\rho_{bnp}(\theta_{bn})}$$

being satisfied, wherein $\rho_{qis}(\theta_{qi})$ is s-wave reflectance of the ith polarizing reflector when the angle of incidence is $\theta_{qi}$, $\rho_{qip}(\theta_{qi})$ is p-wave reflectance of the ith polarizing reflector when the angle of incidence is $\theta_{qi}$, m is the number of total polarizing reflectors in one reflector group, and m is in the range of 1-∞, $\rho_{bjs}(\theta_{bj})$ is s-wave reflectance of the jth compensating reflector when the angle of incidence is $\theta_{bj}$, $\rho_{bjp}(\theta_{bj})$ is p-wave reflectance of the jth compensating reflector when the angle of incidence is $\theta_{bj}$, n is the number of total compensating reflectors in one reflector group and n is in the range of 1-∞.

The present invention can conveniently and effectively eliminate the unwanted polarization caused by reflection. The total reflectance of the polarization-maintaining reflector arrangement is independent of the polarization state of the initial incident light, and the polarization state of the final reflected light is as same as the polarization state of the initial incident light.

DRAWINGS

The disclosure will be explained in more detail in the following text using exemplary embodiments and with reference to the drawings, in which.

DETAILED DESCRIPTION

A beam of incident light with intensity I can be divided into p-wave with intensity $I_p$ and s-wave with intensity $I_s$, wherein the oscillation direction of p-wave is parallel to the incident plane and the oscillation direction of s-wave is perpendicular to the incident plane:

$$I_m = I_p + I_s \tag{1}$$

Accordingly, p-wave amplitude is $A_p$ and s-wave amplitude is $A_s$ and $I \propto A^2$. After the first reflection, the light intensity becomes $$I_m = I_p \rho_{1p}(\theta_1) + I_s \rho_{1s}(\theta_1) \tag{2}$$

wherein $\rho_{1p}(\theta_1)$ is p-wave reflectance of the first polarizing reflector when the angle of incidence is $\theta_1$ and $\rho_{1s}(\theta_1)$ is s-wave reflectance of the first polarizing reflector when the angle of incidence is $\theta_1$.

After the first polarizing reflection, the p-wave amplitude is $A_p\sqrt{\rho_{1p}(\theta_1)}$ and the s-wave amplitude is $A_s\sqrt{\rho_{1s}(\theta_1)}$. If $\Theta_p(1)$ is used to represent $\sqrt{\rho_{1p}(\theta_1)}$ and $\Theta_s(1)$ is used to represent $\sqrt{\rho_{1s}(\theta_1)}$, the p-wave amplitude after first reflection will be expressed as $A_p\Theta_p(1)$ and the s-wave amplitude after first reflection will be expressed as $A_s\Theta_s(1)$, wherein $\Theta_p(1)$ is p-wave amplitude attenuation coefficient and $\Theta_s(1)$ is s-wave amplitude attenuation coefficient.

The reflected light from the first polarizing reflector is the incident light for the second reflector, which may be polarizing or compensating reflector. After the second reflection, the p-wave and s-wave amplitudes are respectively $$A_{p2} = A_p\Theta_p(1)[\sqrt{\rho_{2p}(\theta_2)}\cos\epsilon_2 + \sqrt{\rho_{2s}(\theta_2)}\sin\epsilon_2] \tag{3}$$

$$A_{s2} = A_s\Theta_s(1)[\sqrt{\rho_{2s}(\theta_2)}\cos\epsilon_2 + \sqrt{\rho_{2p}(\theta_2)}\sin\epsilon_2] \tag{4}$$

wherein $\rho_{2p}(\theta_2)$ is p-wave reflectance of the second reflector when the angle of incidence is $\theta_2$ and $\rho_{2s}(\theta_2)$ is s-wave reflectance of the second reflector when the angle of incidence is $\theta_2$. $\epsilon_2$ is the angle between the incident plane for the first polarizing reflector and incident plane for the second reflector. Use $\Theta_p(2)$ to represent $[\sqrt{\rho_{2p}(\theta_2)}\cos\epsilon_2 + \sqrt{\rho_{2s}(\theta_2)}\sin\epsilon_2]$ and use $\Theta_s(2)$ to represent $[\sqrt{\rho_{2s}(\theta_2)}\cos\epsilon_2 + \sqrt{\rho_{2p}(\theta_2)}\sin\epsilon_2]$, wherein $\Theta_p(2)$ is p-wave amplitude attenuation coefficient and $\Theta_s(2)$ is s-wave amplitude attenuation coefficient. If there are m+n reflectors (m polarizing reflectors and n compensating reflectors) in one group of polarization-maintaining reflector arrangement, the final amplitudes of p- and s-wave are $$A_p(m+n) = A_p\Theta_p(1)\cdot\Theta_p(2)\cdot\ldots\cdot\Theta_p(i)\cdot\ldots\cdot\Theta_p(m+n) \tag{5}$$

$$A_s(m+n) = A_s\Theta_s(1)\cdot\Theta_s(2)\cdot\ldots\cdot\Theta_s(i)\cdot\ldots\cdot\Theta_s(m+n) \tag{6}$$

wherein $\Theta_p(i)$ is p-wave amplitude attenuation coefficient caused by the ith reflector and $\Theta_s(i)$ is s-wave amplitude attenuation coefficient caused by the ith reflector.

If equations (5) and (6) satisfy the relation $$\Theta_p(1)\cdot\Theta_p(2)\cdot\ldots\cdot\Theta_p(i)\cdot\ldots\cdot\Theta_p(m+n) = \Theta_s(1)\cdot\Theta_s(2)\cdot\ldots\cdot\Theta_s(i)\cdot\ldots\cdot\Theta_s(m+n) \tag{7}$$

there is no unwanted polarization caused by reflection and the final reflected light intensity is independent of the polarization state of the initial incident light.

In order to satisfy equation (7), the present invention should satisfy two general conditions. At first, in a reflector group, the incident plane for the polarizing reflector is perpendicular to the incident plane for the compensating reflector. In addition, the product of all ratios of s-wave reflectance of the polarizing reflector to the p-wave reflectance of the polarizing reflector is equal to the product of all ratios of s-wave reflectance of the compensating reflector to the p-wave reflectance of the compensating reflector, that is, the product of s-wave reflectance of the polarizing reflector and p-wave reflectance of the compensating reflector is equal to the product of s-wave reflectance of the compensating reflector and p-wave reflectance of the polarizing reflector:

$$\frac{\rho_{q1s}(\theta_{q1})}{\rho_{q1p}(\theta_{q1})}\cdot\ldots\cdot\frac{\rho_{qis}(\theta_{qi})}{\rho_{qip}(\theta_{qi})}\cdot\ldots\cdot\frac{\rho_{qms}(\theta_{qm})}{\rho_{qmp}(\theta_{qm})} = \frac{\rho_{b1s}(\theta_{b1})}{\rho_{b1p}(\theta_{b1})}\cdot\ldots\cdot\frac{\rho_{bjs}(\theta_{bj})}{\rho_{bjp}(\theta_{bj})}\cdot\ldots\cdot\frac{\rho_{bns}(\theta_{bn})}{\rho_{bnp}(\theta_{bn})} \tag{7'}$$

wherein $\rho_{qis}(\theta_{qi})$ is s-wave reflectance of the ith polarizing reflector when the angle of incidence is $\theta_{qi}$, $\rho_{qip}(\theta_{qi})$ is p-wave reflectance of the ith polarizing reflector when the angle of incidence is $\theta_{qi}$, m is the number of total polarizing reflectors in one reflector group, and m is in the range of 1-∞, $\rho_{bjs}(\theta_{bj})$ is s-wave reflectance of the jth compensating reflector when the angle of incidence is $\theta_{bj}$, $\rho_{bjp}(\theta_{bj})$ is p-wave reflectance of the jth compensating reflector when the angle of incidence is $\theta_{bj}$, n is the number of total compensating reflectors in one reflector group and n is in the range of 1-∞. According to the first condition, because the incident plane for the polarizing reflector is perpendicular to the incident plane for the compensating reflector in a reflector group, cosine and sine terms in equations (5) and (6) become 0 and 1 respectively. Therefore, the p-wave amplitude attenuation coefficient becomes the product of the square roots of the p-wave reflectance of m polarizing reflectors and the square roots of the s-wave reflectance of n compensating reflectors, as shown in equation (5'). The s-wave amplitude attenuation coefficient becomes the product of the square roots of the s-wave reflectance of m polarizing reflectors and the square roots of the p-wave reflectance of n compensating reflectors, as shown in equation (6').

$$A_{p(m+n)} = A_p\sqrt{\rho_{q1p}(\theta_{q1p})}\cdot\sqrt{\rho_{b1s}(\theta_{b1s})}\ldots\sqrt{\rho_{qmp}(\theta_{qmp})}\sqrt{\rho_{bns}(\theta_{bns})} \tag{5'}$$

$$A_{s(m+n)} = A_s\sqrt{\rho_{q1s}(\theta_{q1s})}\cdot\sqrt{\rho_{b1p}(\theta_{b1p})}\ldots\sqrt{\rho_{qms}(\theta_{qms})}\sqrt{\rho_{bnp}(\theta_{bnp})} \tag{6'}$$

According to the second condition, because the product of all ratios of s-wave reflectance of the polarizing reflector to the p-wave reflectance of the polarizing reflector is equal to the product of all ratios of s-wave reflectance of the compensating reflector to the p-wave reflectance of the compensating reflector, shown in equation (7'), equation (7) is satisfied. Therefore, the reflector arrangement does not polarize the reflected light, and the final light intensity is independent of the polarization state of the initial incident light.

The following technology scheme is one of the embodiments of the invention.

As a special example, there are only one polarizing reflector and one compensating reflector in the polarization-maintaining reflector arrangement. The incident plane for the polarizing reflector is perpendicular to the incident plane for the compensating reflector. If the two reflectors have the same optical property (i.e. two reflectors have the same reflectance for the same angle of incidence), the incident angle for the polarizing reflector is equal to the incident angle for the compensating reflector.

Now use this arrangement as an example to explain how the embodiment can achieve the purpose. In this arrangement, the reflected light of the polarizing reflector is the incident light of the compensating reflector.

In this example, after the light is incident to a reflector with an angle of $\theta_1$, the intensity of light reflected from the first polarizing reflector is $$I_{mq} = I_p \cdot \rho_{qp}(\theta_1) + I_s \cdot \rho_{qs}(\theta_1) \quad (8)$$

wherein $\rho_{qp}(\theta_1)$ is the p-wave reflectance when the angle of incidence is $\theta_1$, and $\rho_{qs}(\theta_1)$ is the s-wave reflectance when the angle of incidence is $\theta_1$.

Because the incident plane for polarizing reflector is perpendicular to the incident plane for compensating reflector, the reflected s-wave for the polarizing reflector becomes the p-wave for the compensating reflector and the reflected p-wave for the polarizing reflector becomes the s-wave for the compensating reflector. Therefore, the intensity of light reflected from the compensating reflector with incident angle $\theta_2$ is $$I_{mb} = I_p \cdot \rho_{qp}(\theta_1) \rho_{bs}(\theta_2) + I_s \cdot \rho_{qs}(\theta_1) \rho_{bp}(\theta_2) \quad (9)$$

where $\rho_{bp}(\theta_2)$ is the p-wave reflectance of the compensating reflector and $\rho_{bs}(\theta_2)$ is the s-wave reflectance of the compensating reflector.

In this example, if the polarizing reflector and the compensating reflector have the same optical property, i.e. for any angle of incidence, we have $$\rho_{qp}(\theta) = \rho_{bp}(\theta) = \rho_p(\theta) \quad \rho_{qs}(\theta) = \rho_{bs}(\theta) = \rho_s(\theta) \quad (10)$$

Furthermore, if the incident angle for polarizing reflector is equal to the incident angle for compensating reflector, $$\frac{\rho_{qp}(\theta_1)}{\rho_{qs}(\theta_1)} = \frac{\rho_{bp}(\theta_2)}{\rho_{bs}(\theta_2)},$$

that is $$\rho_{qp}(\theta_1)\rho_{bs}(\theta_2) = \rho_{qs}(\theta_1)\rho_{bp}(\theta_2) = C \quad (11)$$

wherein C is a constant. Then the final reflected light intensity is $$I_{mb} = (I_p + I_s) \cdot C \quad (12)$$

Therefore, the final light intensity is independent of the polarization state of the initial incident light, and the reflector arrangement does not cause unwanted polarization to the light. In this special example, the angle of incident is arbitrarily adjustable, and therefore, the angle-dependent problem of the surface-coated reflector can be overcome.

The above process can be explained that although the incident light is polarized by the polarizing reflector, the polarization is compensated and eliminated by the compensating reflector.

When there are m polarizing reflectors and n compensating reflectors in one group of the arrangement, according to the second condition stated above, the product of all ratios of s-wave reflectance of the polarizing reflector to the p-wave reflectance of the polarizing reflector is equal to the product of all ratios of s-wave reflectance of the compensating reflector to the p-wave reflectance of the compensating reflector, that is, $$\frac{\rho_{qs}(\theta_{q1}, \ldots, \theta_{qi}, \ldots, \theta_{qm})}{\rho_{qp}(\theta_{q1}, \ldots, \theta_{qi}, \ldots, \theta_{qm})} = \quad (13)$$

$$\frac{\rho_{q1s}(\theta_{q1})}{\rho_{q1p}(\theta_{q1})} \cdot \ldots \cdot \frac{\rho_{qis}(\theta_{qi})}{\rho_{qip}(\theta_{qi})} \cdot \ldots \cdot \frac{\rho_{qms}(\theta_{qm})}{\rho_{qmp}(\theta_{qm})} = \frac{\rho_{qs}}{\rho_{qp}}$$

$$\frac{\rho_{bs}(\theta_{b1}, \ldots, \theta_{bi}, \ldots, \theta_{bn})}{\rho_{bp}(\theta_{b1}, \ldots, \theta_{bi}, \ldots, \theta_{bn})} =$$

$$\frac{\rho_{b1s}(\theta_{b1})}{\rho_{b1p}(\theta_{b1})} \cdot \ldots \cdot \frac{\rho_{bjs}(\theta_{bj})}{\rho_{bjp}(\theta_{bj})} \cdot \ldots \cdot \frac{\rho_{bns}(\theta_{bn})}{\rho_{bnp}(\theta_{bn})} = \frac{\rho_{bs}}{\rho_{bp}}$$

$$\frac{\rho_{qs}}{\rho_{qp}} = \frac{\rho_{bs}}{\rho_{bp}}$$

$$\rho_{qs} \cdot \rho_{bp} = \rho_{qp} \cdot \rho_{bs} = C$$

wherein $\rho_{qs}$ is the product of m polarizing reflectors' s-wave reflectance and $\rho_{qp}$ is the product of m polarizing reflectors' p-wave reflectance. $\rho_{bs}$ is the product of n compensating reflectors' s-wave reflectance and $\rho_{bp}$ is the product of n compensating reflectors' p-wave reflectance. And C is a constant.

According to the first condition stated above, the incident plane for polarizing reflector is perpendicular to the incident plane for compensating reflector. Because of this condition, the reflected s-wave for the polarizing reflectors becomes the p-wave for the compensating reflector and the reflected p-wave for the polarizing reflector becomes the s-wave for the compensating reflector. Therefore, the final light intensity is $$I_{mb} = I_p \cdot \rho_{qp} \rho_{bs} + I_s \cdot \rho_{qs} \rho_{bp} = (I_s + I_p) C \quad (14)$$

According to equation (14), $I_{mb}$ is independent of the polarization state of the initial incident light, and the reflection does not cause unwanted polarization to the final light.

In one group of reflector arrangement which includes polarizing reflectors and compensating reflectors, as long as the relation between the incident plane for polarizing reflector and the incident plane for compensating reflector is complied with the first condition stated above, the polarizing reflectors can be continuously set in the light path, that is, every polarizing reflectors are set aside each other in the light path; the compensating reflectors can be continuously set in the light path, that is, every polarizing reflectors are set aside each other in the light path; or the polarizing reflectors and the compensating reflectors are alternately set in the light path, that is, in the light path of one reflector, there are at least one polarizing reflector or/and at least one compensating reflector of the other reflector group.

The reflector arrangement can comprise many groups and these groups can be continuously set in the light path. Except for the last group, the reflected light of the last reflector of each group becomes the incident light of the first reflector of the next group. The first reflector of the subsequent group is set next to the last reflector of a preceding reflector group in the light path. If the reflector arrangement comprises e groups of reflectors, the final light intensity is $$I_{me} = I \cdot \rho_{1s}\rho_{1p} \cdot \ldots \cdot \rho_{is}\rho_{ip} \cdot \ldots \cdot \rho_{es}\rho_{ep} \quad (15)$$

wherein $\rho_{is}\rho_{ip}$ is the attenuation coefficient of light intensity caused by the ith reflector group. This final light intensity is independent of the polarization state of the initial incident light, and the reflector arrangement does not cause unwanted polarization to the light.

Furthermore, the groups of the reflector arrangement can be alternately set. For example, one polarizing reflector of the first group can be set beside the compensating reflector of the second group. This setting can be obtained by equation (15). According to equation (15), $I_{me}$ is not changed if the coefficients in equation (15) are exchanged. When many groups are arranged in light path, every polarizing reflector and compensating reflector reflects at least once. If the reflectors are suitably arranged, some reflectors can reflect more than once. As long as the two conditions stated above are complied, the final light intensity is independent of the polarization state of the initial incident light, and the multiple reflections do not cause unwanted polarization to the light.

The technology scheme can be further defined.

The polarization-maintaining reflector arrangement comprises at least one reflector group. In the light path, optical element such as light source and detectors can be set ahead of the first reflector or/and behind the last reflector or/and between the reflectors. In the reflector arrangement, the first reflector is specified as a polarizing reflector, and the other reflectors can be functioned as polarizing reflectors or compensating reflectors. The unwanted polarization caused by the polarizing reflectors can be compensated or eliminated by the compensating reflectors, but the unwanted polarization caused by the other optical elements in the light path can not be eliminated by the reflector arrangement.

As an embodiment of the reflector arrangement, a group of one polarizing reflector and one compensating reflector is set in the light path. The reflected light from the polarizing reflector becomes the incident light for the compensating reflector. The incident angle for the first polarizing reflectors is 45°. To satisfy the conditions stated above, the plane angle between the plane of polarizing reflector and the plane of compensating reflector should be 60° or 120°. In the group, the polarizing reflector can be set at angle of 45° to the plane of the horizon. The incident light comes down upright, reflected by the polarizing reflector and is then horizontally incident to the compensating reflector which is perpendicular to the plane of horizon. The projection of normal of the polarizing reflector on the plane of horizon is at an angle of 45° to the normal of the compensating reflector. Therefore, the incident angle for the polarizing reflector is equal to the incident angle for the compensating reflector. The reflected light from the compensating reflector comes out at angle of 90° to the reflected light from the polarizing reflector.

When using the polarization-maintaining reflector arrangement, all the polarizing reflectors and compensating reflectors can be set at fixed position.

When using the polarization-maintaining reflector arrangement, part or all of the reflectors can also be moving as long as the relative position between the polarizing and compensating reflectors satisfies the above condition. As a special example, the polarizing and compensating reflectors can rotate synchronously and coaxially (or on a same axis).

The polarizing reflectors and compensating reflectors can be plane optical mirror or spectroscope or other optical elements with reflection function.

The polarizing reflectors and compensating reflectors comprise of a glass base, on which a layer of reflecting film is coated for reflection, and a protection layer is outside the reflecting film. The surface-coated vitreous base can effectively reduce the light absorption of the glass, increase the average reflectance, and diminish the difference between the p- and s-wave reflectance.

The polarizing reflectors and compensating reflectors can also include a reflecting film which is imbedded between two glasses. The reflectors then comprises of surface glass, reflecting film and glass base in order, wherein the surface glass, the reflecting film and glass base are stick together.

The polarizing reflectors and compensating reflector can also comprise surface glass and a reflecting film, wherein the reflecting film is stick behind the surface glass.

Other existing technology for manufacturing reflector can also be used in the invention. In order to effectively eliminate the polarization, the quality of the polarizing reflectors and compensating reflectors should be advanced, the average reflectance of the polarizing reflectors and compensating reflectors should be increased, and the difference between p-wave reflectance and s-wave reflectance of the polarizing reflectors and compensating reflectors should be reduced.

For each group of the reflector arrangement in the invention, the product of all polarizing reflectors' ratio of s-wave reflectance to p-wave reflectance is equal to the product of all compensating reflectors' ratio of s-wave reflectance to p-wave reflectance. Furthermore, the incident plane for the polarizing reflectors is perpendicular to the incident plane for the compensating reflectors. Therefore, the final reflected light intensity is independent of the polarization state of the initial incident light, and no unwanted polarization is caused by the reflectors.

For the special example in which two reflectors with the same optical property are used as one polarizing reflector and one compensating reflector respectively, if only the incident angle for polarizing reflector is equal to the incident angle for the compensating reflector, the unwanted polarization caused by the polarizing reflector and compensating reflector can be eliminated by each other, and the final reflected light intensity is independent of the initial angle of incidence. One or more groups of reflector arrangement can be used in the light path, if only every polarization caused by polarizing reflectors is compensated by the compensating reflectors, unwanted polarization of the final light is eliminated.

Figure 3:
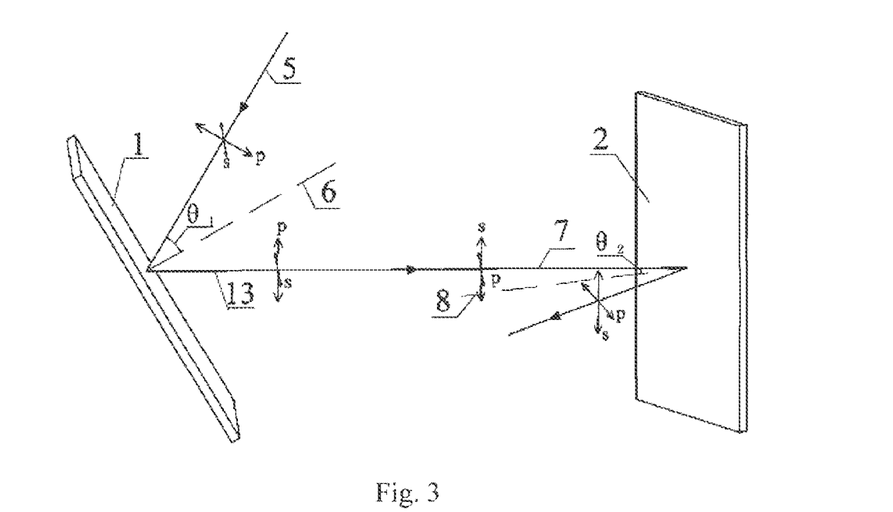
FIG. 3 is a schematic illustration of an example of the invention.

Embodiment 1:

FIG. 3 shows a schematic illustration of an example of the present invention, wherein the polarization-maintaining reflector arrangement comprises only one reflector group, i.e. a polarizing reflector 1 and a compensating reflector 2 with the same optical property. The incident light for compensating reflector 2 is the reflected light from polarizing reflector 1. The incident plane for polarizing reflecting is formed by the incident light 5 and the normal 6 of polarizing reflector 1, and the incident plane for compensating reflecting is formed by the incident light 7 and the normal 8 of compensating reflector 2. After the incident angle $\theta_1$ and the incident plane for polarizing reflector 1 being determined, the position of compensating reflector 2 can be uniquely determined by the following way: the incident plane for polarizing reflector 1 is perpendicular to the incident plane for compensating reflector 2, and the incident angle $\theta_1$ is equal to the incident angle $\theta_2$ which is between the reflected light 13 from the polarizing reflector and the normal of compensating reflector 2. The two reflectors with a same angle of incidence satisfy the relation $$\frac{\rho_{qp}(\theta_1)}{\rho_{qs}(\theta_1)} = \frac{\rho_{bp}(\theta_2)}{\rho_{bs}(\theta_2)},$$

And the final light intensity is $$I_{mb} = I_p \cdot \rho_{qp}(\theta_1)\rho_{bs}(\theta_2) + I_s \cdot \rho_{qs}(\theta_1)\rho_{bp}(\theta_2) = (I_p + I) \cdot C$$

where C is a constant. The polarization state of this final light is not changed relative to the initial incident light.

Figure 4:
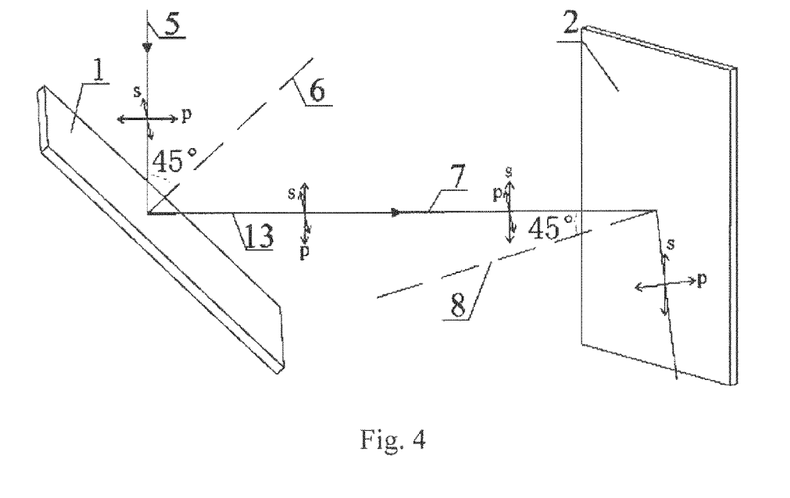
FIG. 4 is a schematic illustration of another example of the invention.

Embodiment 2:

FIG. 4 shows a schematic illustration of another example of the invention, wherein the technology scheme is similar to the first example, that is, the polarization-maintaining reflector arrangement comprises only a polarizing reflector 1 and a compensating reflector 2 with the same optical property. The incident angle $\theta_1$ is 45° in this example. The incident light 5 comes down upright to polarizing reflector 1 which is set at 45° to the horizontal plane, and then the reflected light 13, which is also the incident light 7 for compensating reflector 2, goes horizontally to the compensating reflector 2 which is perpendicular to the horizontal plane. The incident plane for polarizing reflecting is formed by the incident light 5 and the normal 6 of polarizing reflector 1, and is perpendicular to the incident plane for compensating reflecting which is formed by the incident light 7 and the normal 8 of compensating reflector 2. The angle between normal 8 and the projection of normal 6 on the horizontal plane is 45°. The final reflected light from the compensating reflector 2 comes out at an angle of 90° to the reflected light from the polarizing reflector 1. Therefore, to satisfy the conditions, the angle between the plane of polarizing reflector 1 and the plane of polarizing reflector 2 is 60° or 120°. If so, the incident angle is 45° for both the polarizing reflector 1 and the compensating reflector 2, and the relation $$\frac{\rho_{qp}(\theta_1)}{\rho_{qs}(\theta_1)} = \frac{\rho_{bp}(\theta_2)}{\rho_{bs}(\theta_2)},$$

is satisfied.

Figure 5:
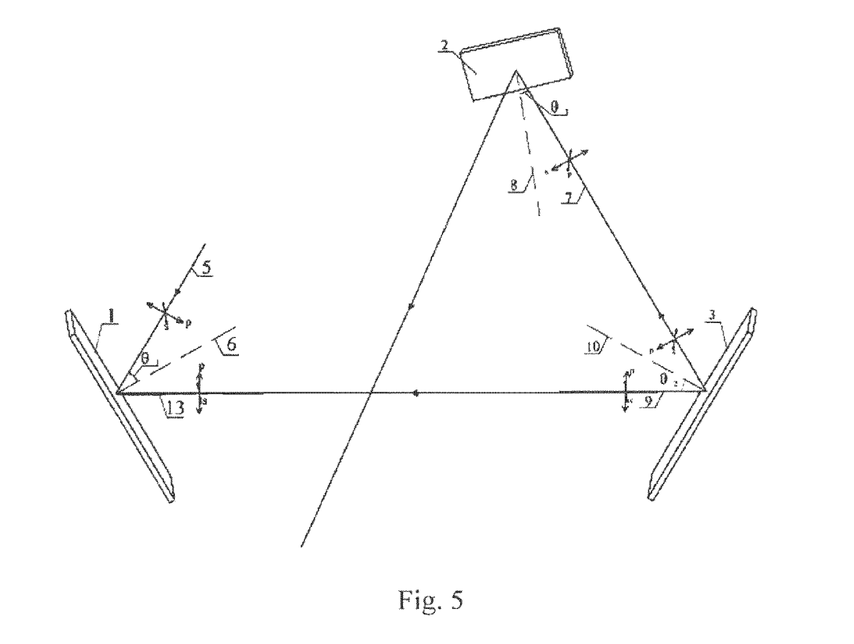
FIG. 5 is a schematic illustration of the third example of the invention.

Embodiment 3:

FIG. 5 shows a schematic illustration of the third example of the invention. One reflector group is used in this example, including two polarizing reflectors 1 and 3 and one compensating reflector 2. The reflected light 13 from polarizing reflector 1 is the incident light for reflector 3. The first polarizing incident plane which is formed by the incident light 5 and the normal 6 of reflector 1 is the same as the second polarizing incident plane which is formed by the incident light 9 and the normal 10 of reflector 3, and this plane is perpendicular to the compensating incident plane which is formed by the incident light 7 and the normal 8 of reflector 2.

For reflector i (i=1, 2, 3), when the incident angle is $\theta_i$, the p-wave reflectance is $\rho_{ip}(\theta_i)$ and the s-wave reflectance is $\rho_{is}(\theta_i)$. They satisfy the relation:

$$\frac{\rho_{1s}(\theta_1)}{\rho_{1p}(\theta_1)} \cdot \frac{\rho_{2s}(\theta_2)}{\rho_{2p}(\theta_2)} = \frac{\rho_{3s}(\theta_3)}{\rho_{3p}(\theta_3)}.$$

In addition, according to the path-reversal principle, if the light path direction is reversed in FIG. 5, two polarizing reflector 1 and 3 become compensating reflectors and one compensating reflector 2 becomes the polarizing reflector while the other condition remain the same. The polarization-maintaining condition is also satisfied.

Figure 6:
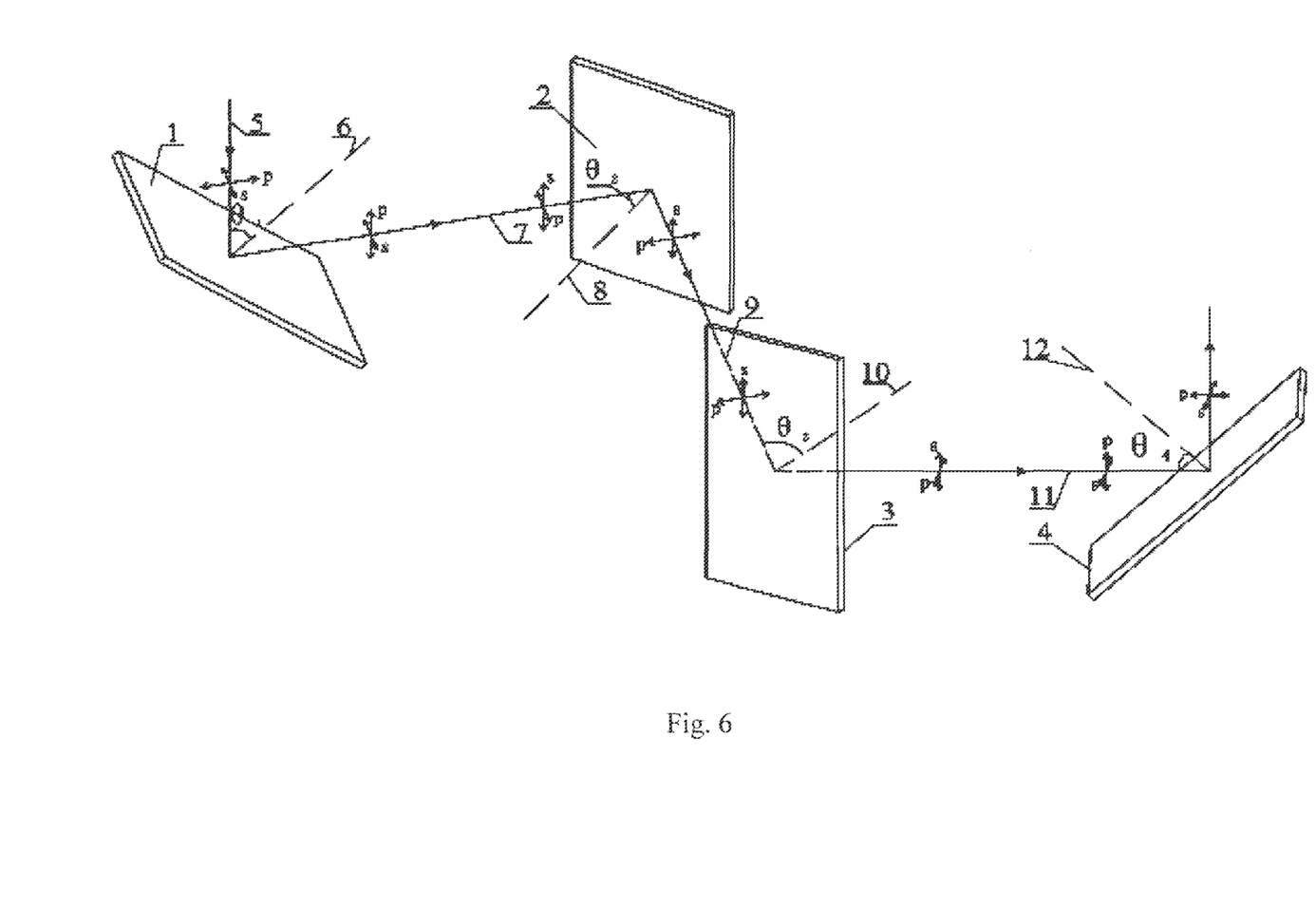
FIG. 6 is a schematic illustration of the forth example of the invention.

Embodiment 4:

FIG. 6 shows a schematic illustration of the fourth example of the invention, wherein two reflector groups are included in the light path, and there are one polarizing reflector and one compensating reflector with the same optical property in each group. The first polarizing reflector 1 has the same optical property as the first compensating reflector 2. The second polarizing reflector 3 has the same optical property as the second compensating reflector 4. Two reflector groups are set continuously: the reflected light from the first polarizing reflector 1 is the incident light for the first compensating reflector 2, and then the light is reflected on the second polarizing reflectors 3 and goes to the second compensating reflector 4.

The first polarizing incident plane formed by the incident light 5 and the normal line 6 is perpendicular to the first compensating incident plane formed by the incident light 7 and the normal line 8, and the incident angle $\theta_1$ for the first polarizing reflector 1 is equal to the incident angle $\theta_2$ for the first compensating reflector 2. The second polarizing incident plane formed by the incident light 9 and the normal line 10 is perpendicular to the second compensating incident plane formed by the incident light 11 and the normal line 12, and the incident angle $\theta_3$ for the second polarizing reflector 3 is equal to the incident angle $\theta_4$ for the second compensating reflector 4. But $\theta_1$ need not be equal to $\theta_3$.

Figure 7:
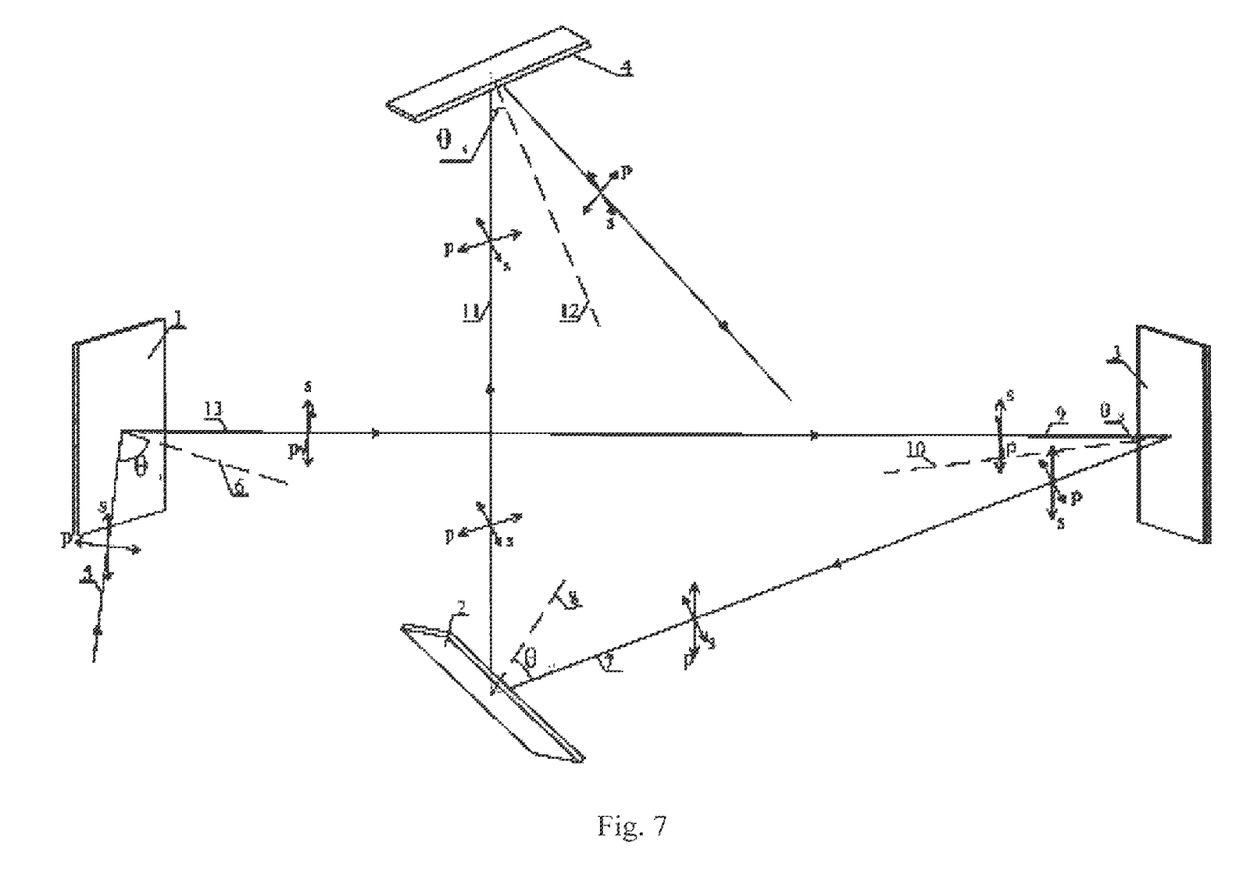
FIG. 7 is a schematic illustration of the fifth example of the invention.

Embodiment 5:

FIG. 7 shows a schematic illustration of the fifth example of the invention, wherein two reflector groups are included in the light path, and there are one polarizing reflectors and one compensating reflector in each group, in which the two reflectors have the same optical property. The first polarizing reflector 1 has the same optical property as the first compensating reflector 2 and the second polarizing reflector 3 has the same optical property as the second compensating reflector 4. Two reflector groups of the polarizing and compensating reflectors are set alternately: the reflected light 13 from the first polarizing reflectors 1 is the incident light 9 for the second polarizing reflectors 3, and then the light is reflected on the first compensating reflector 2 and goes to the second compensating reflector 4.

The first polarizing incident plane formed by the incident light 5 and the normal line 6 is perpendicular to the first compensating incident plane formed by the incident light 7 and the normal line 8, and the incident angle ($\theta_1$) for the first polarizing reflector 1 is equal to the incident angle ($\theta_2$) for the first compensating reflector 2. The second polarizing incident plane formed by the incident light 9 and the normal line 10 is perpendicular to the second compensating incident plane formed by the incident light 11 and the normal line 12, and the incident angle ($\theta_3$) for the second polarizing reflector 3 is equal to the incident angle ($\theta_4$) for the second compensating reflector 4. But $\theta_1$ need not be equal to $\theta_3$. The four reflectors 1,2,3,4 can rotate synchronically and coaxially while the values of the incident angles $\theta_1$ and $\theta_3$ are not changed and the relative position of the reflectors is maintained.

Embodiment 6

Figure 8:
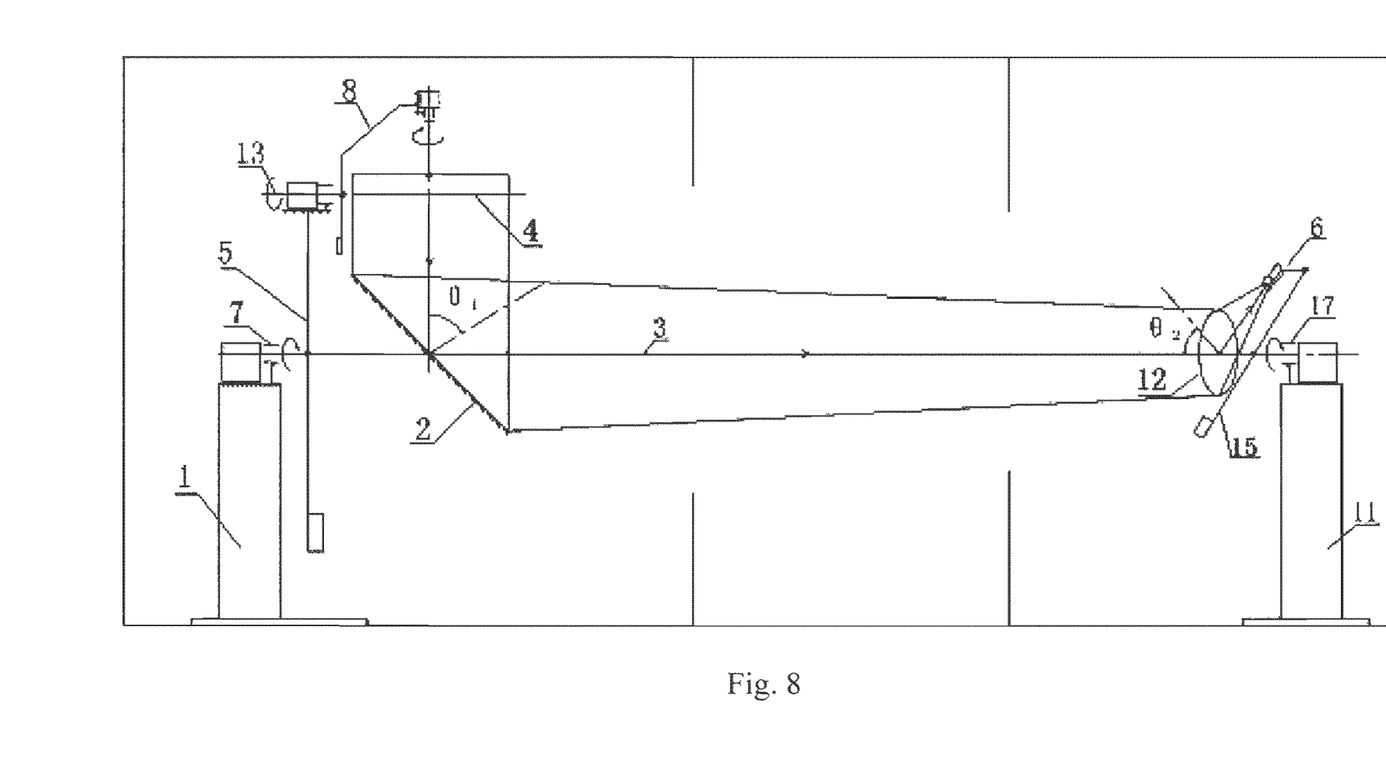
FIG. 8 is a schematic illustration of the sixth example of the invention.

FIG. 8 shows a schematic illustration of an application example of the invention. The reflector arrangement comprises a polarizing reflector 2 and a compensating reflector 12 adopted in a goniophotometer. The goniophotometer comprises a main support tower 1, a second support tower 11, a main horizontal axis 3, a rotation drive mechanism 7, a swing arm 5 and a lamp support arm 8. The main horizontal axis 3 is virtually placed. The rotation drive mechanism 7 is placed coaxially with the main horizontal axis 3. The output shaft of the rotation drive mechanism 7 is connected to the polarizing reflector 2 and a swing arm 5, and a lamp support arm 8. One end of the lamp support arm 8 is connected to an end of the swing arm 5 through a auxiliary axis 13, and the other end of the lamp support arm 8 holds a test light source 4 through a vertical rotation drive mechanism which drives the test light source 6 around its vertical axis that is perpendicular to the main horizontal axis 3. When measuring, the swing arm 5 and the lamp support arm 8 is rotated around polarizing reflector 2, and the lamp support arm 8 is rotated around the auxiliary axis 13 to keep the working state of the test light source 4. On the second support tower 11, a second swing arm 15 is placed coaxially with the main horizontal axis 3 and is connected to a second rotation drive mechanism 17. On the second swing arm, the compensating reflector 12 is placed coaxially with the main horizontal axis 3. A detector 6 and a weight balancer are placed on the two ends. The two reflectors have a same optical property. A beam of light from the test light source 4 is reflected by the polarizing reflector 2 and come to the compensating reflector 12 and then is reflected to the detector 6. The two reflectors are rotated around the main horizontal axis 3 while the incident plane of the polarizing reflector 2 is kept perpendicular to the incident plane of the compensating reflector 12, and the incident angle $\theta_1$ is kept equal to the incident angle $\theta_2$.

The invention claimed is:

1. A polarization-maintaining reflector arrangement comprising:
   a first reflector group, the first reflector group including a first polarizing reflector and a first compensating reflector,
   wherein the first polarizing reflector and the first compensating reflector are rotatable, and an incident plane of the first polarizing reflector are kept perpendicular to an incident plane of the first compensating reflector in the reflector group, and
   a product of s-wave reflectance of the first polarizing reflector and p-wave reflectance of the first compensating reflector being equal to a product of s-wave reflectance of the first compensating reflector and p-wave reflectance of the first polarizing reflector in the reflector group.

2. The polarization-maintaining reflector arrangement according to claim 1, wherein the arrangement further comprises another one or more reflector groups each including at least one polarizing reflector and at least one compensating reflector, and
   a product of s-wave reflectance of the at least one polarizing reflector and p-wave reflectance of the at least one compensating reflector being equal to a product of s-wave reflectance of the at least one compensating reflector and p-wave reflectance of the at least one polarizing reflector in the respective reflector group.

3. The polarization-maintaining reflector arrangement according to claim 1, wherein the arrangement further comprises one or more reflector groups each including a plurality of polarizing reflectors and a plurality of compensating reflectors,
   incident planes of each of the plurality of polarizing reflectors being in a same plane or parallel to each other, incident planes of each of the plurality of compensating reflectors being in a same plane or parallel to each other,
   wherein the incident planes of the plurality of polarizing reflectors are perpendicular to the incident planes of the plurality of compensating reflectors in the respective reflector group, and
   a product of s-wave reflectances of all of the plurality of polarizing reflectors and p-wave reflectances of all of the plurality of compensating reflectors being equal to a product of s-wave reflectances of all of the plurality of compensating reflectors and p-wave reflectances of all of the plurality of polarizing reflectors in the respective reflector group.

4. The polarization-maintaining reflector arrangement according to claim 1, wherein the first reflector group further includes one or more polarizing reflectors, and all of the polarizing reflectors of the first reflector group are set continuously in a light path.

5. The polarization-maintaining reflector arrangement according to claim 1, wherein the arrangement further includes one or more reflector groups set continuously in a light path, with all reflectors of a preceding reflector group of each two adjacent reflector groups preceding all reflectors of a subsequent reflector group in the two adjacent reflector groups in the light path.

6. The polarization-maintaining reflector arrangement according to claim 1, wherein the arrangement further includes one or more reflector groups set in a light path with at least one reflector of a preceding reflector group of two adjacent reflector groups being set subsequent to a reflector of a subsequent reflector group in the two adjacent reflector groups in the light path.

7. The polarization-maintaining reflector arrangement according to claim 1, further comprising other optical elements preceding or subsequent to the first polarizing reflector or the first compensating reflector, or between the first polarizing and the first compensating reflectors in a light path.

8. The polarization-maintaining reflector arrangement according to claim 1, wherein the first polarizing reflector has a same optical property as the first compensating reflector, and an incident angle with the polarizing reflector equals to an incident angle with the compensating reflector.

9. The polarization-maintaining reflector arrangement according to claim 8, wherein the incident angle with the first polarizing reflector is 45°, and a plane angle between the first polarizing reflector and the first compensating reflector is 60° or 120°.

10. A polarization-maintaining reflector arrangement, comprising:
    a reflector group, the reflector group including m polarizing reflector(s) and n compensating reflector(s),
    incident plane(s) of all of the m polarizing reflector(s) being in a same plane or parallel to each other, incident plane(s) of all the n compensating reflector(s) being in a same plane or parallel to each other, the incident plane(s) of the m polarizing reflector(s) being perpendicular to the incident plane(s) of the n compensating reflector(s) in the reflector group,
    wherein m is a total number of the polarizing reflectors in one reflector group, and m is in the range of 2-∞, n is a total number of the compensating reflectors in one reflector group and n is in the range of 1-∞; and $$\frac{\rho_{q1s}(\theta_{q1})}{\rho_{q1p}(\theta_{q1})} \cdot \ldots \cdot \frac{\rho_{qis}(\theta_{qi})}{\rho_{qip}(\theta_{qi})} \cdot \ldots \cdot \frac{\rho_{qms}(\theta_{qm})}{\rho_{qmp}(\theta_{qm})} =$$

$$\frac{\rho_{b1s}(\theta_{b1})}{\rho_{b1p}(\theta_{b1})} \cdot \ldots \cdot \frac{\rho_{bjs}(\theta_{bj})}{\rho_{bjp}(\theta_{bj})} \cdot \ldots \cdot \frac{\rho_{bns}(\theta_{bn})}{\rho_{bnp}(\theta_{bn})}$$

being satisfied,
    wherein $\rho_{qis}(\theta_{qi})$ is s-wave reflectance of the ith polarizing reflector when the angle of incidence $\theta_{qi}$, $\rho_{qip}(\theta_{qi})$ is p-wave reflectance of the ith polarizing reflector when the angle of incidence is $\theta_{qi}$,
    $\rho_{bjs}(\theta_{bj})$ is s-wave reflectance of the jth compensating reflector when the angle of incidence is $\theta_{bj}$, $\rho_{bjp}(\theta_{bj})$ is p-wave reflectance of the jth compensating reflector when the angle of incidence is $\theta_{bj}$.

11. The polarization-maintaining reflector arrangement according to claim 1, wherein the first reflector group includes a second compensating reflectors, the first and second compensating reflectors set continuously in a light path.

12. A polarization-maintaining reflector arrangement comprising,
   at least one reflector group, the at least one reflector group including a first polarizing reflector, a second polarizing reflector and a compensating reflector;
   incident planes of the first and second polarizing reflectors being in a same plane or parallel to each other, incident planes of the polarizing reflectors being perpendicular to an incident plane of the compensating reflector; and
   a product of s-wave reflectances of all the polarizing reflectors in the reflector group and a p-wave reflectance of the compensating reflector being equal to a product of an s-wave reflectance of the compensating reflector and p-wave reflectances of all the polarizing reflectors in the reflector group.

* * * * *